Oct. 25, 1966  J. J. HENDRICKSON  3,281,157
CHUCK FOR VIBRATORY TOOL
Filed May 18, 1962  3 Sheets-Sheet 1
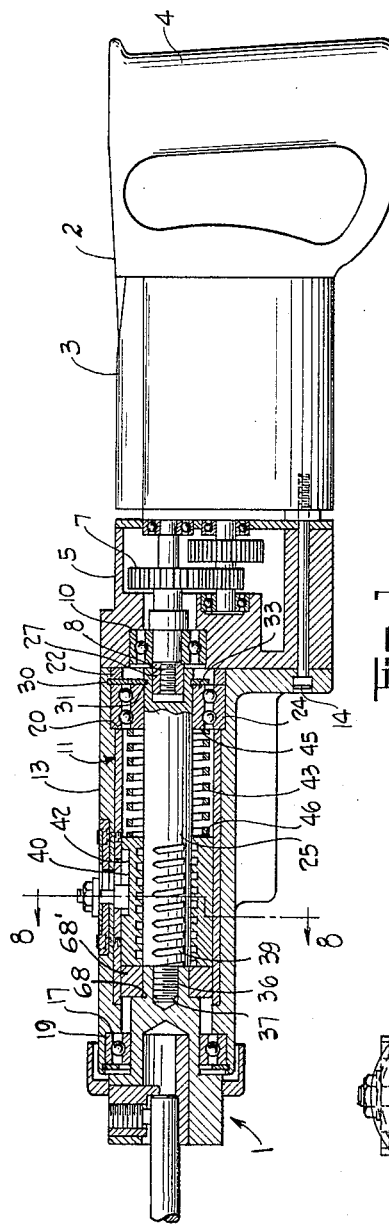
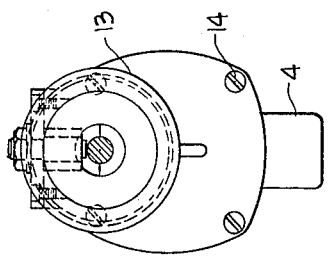
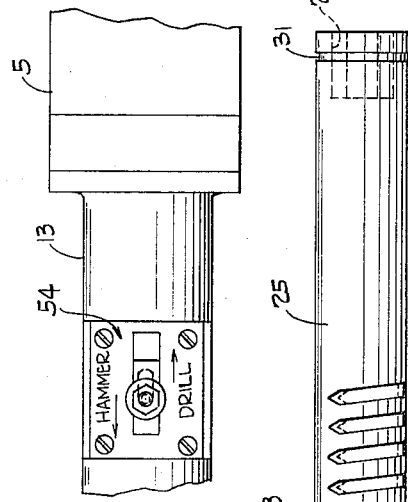
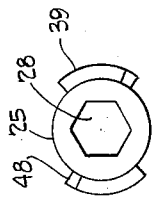
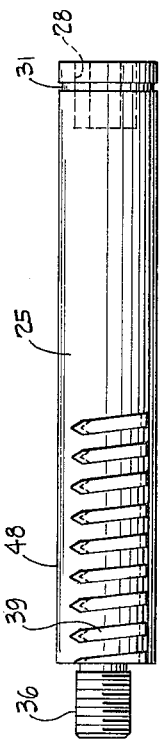
INVENTOR.
JOHN J. HENDRICKSON
BY Bosworth, Sessions,
Herrstrom & Knowles
ATTORNEYS.

Oct. 25, 1966    J. J. HENDRICKSON    3,281,157
CHUCK FOR VIBRATORY TOOL
Filed May 18, 1962    3 Sheets-Sheet 2
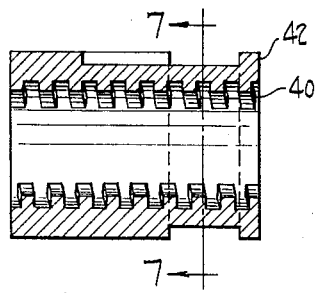
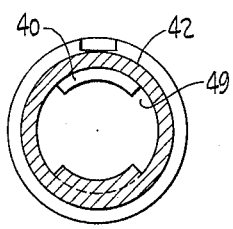
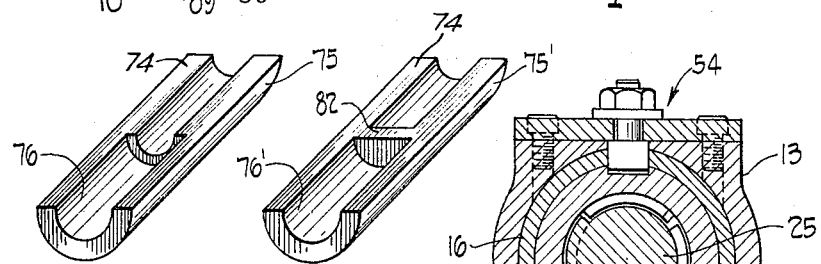
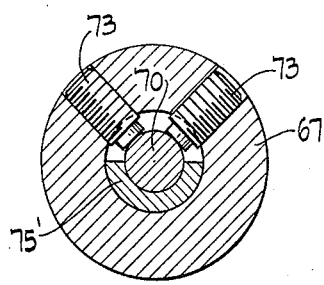
INVENTOR.
JOHN J. HENDRICKSON
BY Bosworth, Sessions,
Herrstrom & Knowles
ATTORNEYS.

Oct. 25, 1966  J. J. HENDRICKSON  3,281,157
CHUCK FOR VIBRATORY TOOL

Filed May 18, 1962  3 Sheets-Sheet 3

INVENTOR.
JOHN J. HENDRICKSON
BY Bosworth, Sessions,
Herratrom & Knowles
ATTORNEYS.

United States Patent Office 3,281,157
Patented Oct. 25, 1966

3,281,157
CHUCK FOR VIBRATORY TOOL
John J. Hendrickson, 217 Little Mountain Road,
Mentor, Ohio
Filed May 18, 1962, Ser. No. 197,167
12 Claims. (Cl. 279—83)

This application is a continuation-in-part of copending application, Serial No. 796,643, filed March 2, 1959, now United States Patent No. 3,080,008.

This invention relates to chucks and more particularly to chucks for tightly holding tools, bits and the like which are subject to frequent or rapid vibration.

In the fields to which this invention relates the word "tool" has a dual meaning and is commonly used to refer to both an entire apparatus or mechanism and to the instrument or working member which is supported within the chuck of the apparatus. Accordingly, in this application, in order to obviate confusion, the entire apparatus will be referred to variously as the "apparatus," or "drill" and the instrument or working member will be referred to as the "bit" and, unless plainly inappropriate, each such word shall be construed broadly and not as a word of limitation. Thus the word "bit" includes, inter alia, any twist drill, auger, shaft or chipper used or useful with apparatus embodying all or part of this invention, and the term "drill" includes, inter alia, any percussive tool, rotary-impact drill, reciprocable hammer or other apparatus embodying all or part of one or more of the embodiments and modifications of this invention.

The general object of this invention is to provide a new and improved chuck for use in rotary-impact drills, percussive tools and other apparatus in which the chuck and the bit carried thereby are subject to frequent or rapid vibration.

Another object of this invention is the provision of improved means for tightly and securely holding bits, and the like, which are subjected to rapid and frequent vibrations and/or impacts over relatively long periods of time.

Other objects of this invention include the provision of a new and improved chuck, for rotary-impact drills, percussive tools and other apparatus in which the bit is subjected to frequent and repeated vibrations and impacts, which is efficient and readily and easily used; which is useful with bits of different shank size and is readily and interchangeably adapted for use with bits of any predetermined shank size; which is not destroyed or damaged by the vibration and impacts transmitted to or by the bit; which is usable with apparatus which also imparts a rotary motion to the bit; which is of simple construction; which is economically manufactured and used; which holds the bit tightly and without loosening even when the apparatus is subjected to periods of protracted use and the bit is impacted, jarred and vibrated over relatively long periods of time; which firmly and properly supports the bits without deleteriously damaging them; which is useful with ordinary bits having ordinary shanks; and, which is readily used by inexperienced and unskilled operators.

Another object of this invention is the provision of an improved set screw, for holding and/or coacting with bits, shafts, and other cylindrical objects, surfaces and the like, which is easily tightened and released by the operator, and, which is self-locking and remains tight and resists loosening even when the apparatus of which it is a part is subjected to rapid and frequent vibrations and/or impacts over relatively long periods of time.

Further objects of this invention include the provision of a self-locking set screw which remains tight and resists loosening even when subjected to relatively long periods of rapid and frequent vibrations, which is easily and economically manufactured and used; which is usable in current applications in lieu of present common type set screws, without otherwise modifying, changing or adapting the apparatus within which the set screw is used; which may be withdrawn and reused without damage to the threads of the set screw or of the hole within which the set screw is mounted; which has a relatively large surface engagement with the bit, shaft, or surface which is being tightened and held in place thereby; and, which coacts with the bit, shaft or surface which it engages and the hole within which it is disposed to resist loosening due to vibration and the like.

Still another object of this invention is to provide a chuck obtaining one or more of the objects and advantages set forth above.

The manner of obtaining these and other objects and advantages of this invention will become apparent from the following description of preferred and modified forms thereof, reference being had to the attached drawings in which:

FIGURE 1 is a view, partly in side elevation and partly in longitudinal section, of a rotary-impact drill having a chuck embodying a preferred form of this invention;

FIGURE 2 is a front elevational view of the drill shown in FIGURE 1;

FIGURE 3 is a top plan view of the drill shown in FIGURE 1;

FIGURE 4 is an elevation on an enlarged scale of the screw shaft shown in the drill in FIGURE 1;

FIGURE 5 is an end view of the screw shaft shown in FIGURE 4;

FIGURE 6 is a longitudinal section on an enlarged scale of the operating nut shown in FIGURE 1;

FIGURE 7 is a transverse section viewed along the line 7—7 of FIGURE 6;

FIGURE 8 is a transverse section on an enlarged scale viewed along the line 8—8 of FIGURE 1;

FIGURE 9 is an enlarged, broken, longitudinal section of the chuck shown in FIGURE 1;

FIGURE 10 is a transverse section viewed along the line 10—10 of FIGURE 9;

FIGURE 11 is a perspective view of a preferred form of insert for the chuck shown in FIGURE 9;

FIGURE 12 is a perspective view of a modified form of insert for the chuck shown in FIGURE 9;

FIGURE 13 is a sectional view, similar to FIGURE 11, showing a modified form of chuck embodying this invention;

Figure 16:
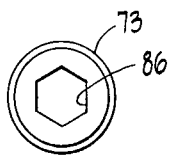
FIGURE 16 is an end view of the head of the set screw shown in FIGURE 14.

A chuck embodying this invention will be described in connection with and in the environment of the rotary-impact drill shown in the drawings, however, it is to be understood that this is by way of example only and that chucks embodying this invention and/or parts or portions thereof may be used with other apparatus adapted to impact or vibrate the bit used therein and other such apparatus may be adapted for use with chucks embodying this invention or parts or portions thereof.

Broadly, this invention comprises a new and improved chuck for tightly holding bits and the like, which are subjected to rapid and/or frequent vibration or impacts, including a new and improved self-locking set screw and the like for holding shafts and other objects subject to vibration, which effectively resists loosening and dislodgement due to vibration.

A chuck, embodying a preferred form of this invention is indicated generally at 1 in FIGURE 1, and is shown by way of illustration, with a rotary-impact drill 2, representative of the broad type of apparatus with which it is used.

Drill 2 includes a housing 3 forming a handle 4 and enclosing an ordinary electric motor (not shown), having suitable leads (not shown) for connection to a source of electrical power. An extension 5 on the forward end of housing 2 encloses and supports a gear train, indicated generally at 7, which is driven by the motor and in turn drives a stub shaft 8 supported on suitable bearings 10.

Drill 1 is adapted to both rotate and pound or impact the bit and to this end is provided with the rotary impact mechanism embodying this invention and indicated generally at 11.

Mechanism 11 is disposed within a substantially cylindrical, barrel-like housing 13, which, with housing extension 5, is mounted on housing 2 by suitable means such as screws 14. As shown, housing 13 is protected from wear due to the relatively moving parts of the mechanism 11 by means of a hardened steel insert or sleeve 16 and is provided, at its forward end (leftward end, as viewed), with a bearing seat 17 within which a suitable bearing 19 is disposed. The rearward end of housing 13 is counterbored as at 20 to provide a seat for thrust bearing 24, which is held in place by spacer 22.

Mechanism 11, also, includes a longitudinally extending screw shaft 25, which is supported for rotary motion within housing 13 and sleeve 16 by bearing 24 and functions both to transmit rotary motion to the chuck 1 and bit carried thereby and as the actuating part of the impacting or percussive means.

Screw shaft 25 is operatively interconnected with and rotated by stub shaft 8 and has limited axial movement relative to the stub shaft and housing 13 for purposes which will hereinafter be more fully explained. To this end an angled fitting, such as hexagonal nut 27, is mounted on shaft 8 and extends within a correspondingly shaped recess 28, see FIGURES 1, 4 and 5 which is provided in the inner end of shaft 25.

Recess 28 is of greater depth than the length of nut 27 and the relative diameters of nut 27 and recess 28 are such that screw shaft 25 has a sliding fit with the nut 27, but the nut cannot rotate within the recess without engaging and rotating the screw shaft.

Screw shaft 25 is retained in position within housing 13 by means of a split ring retainer 30 which seats in an arcuate groove 31 provided in the screw shaft adjacent the inner end thereof. Retainer 30 is of sufficient size to engage and act between the screw shaft and the inner side 33 of bearing 24.

Chuck 1 is mounted on the outer end, leftward end as viewed, of screw shaft 25 and is adapted to be rotated by the screw shaft. Conveniently chuck 1 is removably mounted on screw shaft 25 by means of threads 36 on screw shaft 25 and threaded recess 37 in chuck 1. Thus screw shaft 25 transmits rotary motion from stub shaft 8 to the chuck and drives the chuck.

Screw shaft 25 also actuates the nut 42 which translates the rotary motion of the screw shaft into high speed, short stroke, reciprocable motion and directs repeated blows or impacts against chuck 1 and thereby the bit and object being worked.

To this end screw shaft 25 has screw threads 39 which engage and coact with threads 40 of nut 42. Nut 42 is held against rotation so as to be displaced in an inward direction away from chuck 1 by the action of shaft 25.

Nut 42 is forcefully urged toward and into engagement with chuck 1 by means of coil spring 43 and is displaced rearwardly by screw shaft 25 against the force of spring 43. Spring 43 is disposed about screw shaft 25 and acts between the outer side 45 of bearing 24 and the inner face 46 of nut 42 and is conveniently flat for longer life. Nut 42 is disposed within sleeve 16 and about screw shaft 25 and is of such external diameter relative to the interior diameter of sleeve 16 as to have a freely sliding fit therewith.

In order to provide for return of the nut 42, under the force of spring 43, against the chuck 1, after the nut has been displaced inwardly, rightwardly as viewed, by the screw shaft 25, the threads 39 and 40 on screw shaft 25 and nut 42, respectively, are each broken away as at 48 and 49, respectively, to provide alternate lengths of longitudinally aligned threads or lands and voids, see FIGURES 4, 5, and 7. When rotation of the screw shaft brings the lands of the threads 39 into engagement with the lands of threads 40, the nut is displaced inwardly. When continued rotation of screw shaft 25 brings the lands of threads 39 and 40 into respective longitudinal alignment with the voids 49 and 48 of threads 40 and 39, respectively, spring 43 acts upon nut 42 and forces the nut outwardly, leftwardly as viewed, against the chuck 1, the lands of threads 39 and 40 passing longitudinally along the voids 49 and 48, respectively. Threads 39 and 40 comprise two arcuately spaced rows of lands and voids thereby providing for two inward displacements of nut 42 and two outward thrusts or throws of the nut against the chuck 1 for each revolution of screw shaft 25. Voids 48 and 49 in threads 39 and 40, respectively, are each of greater arcuate length than arcuate length of the respective lands. A proper engagement is made between the lands of threads 39 and 40 upon each half turn of the screw shaft 25, which is also a half turn of the screw shaft relative to the nut, because the threads 39 and 40 are double threads.

Drill 2 also has means, indicated generally at 54 for selectively changing the drill from a rotary-impact drill, as described above, to an ordinary rotary drill and back again.

As noted above, recess 28 in screw shaft 25 is of greater depth than the length of hexagonal nut 27. This play is provided to the end that when the bit is applied to the surface of the object to be drilled, the mechanism 11 is displaced inwardy and the blows or impacts delivered to the chuck 1 by nut 42 are directed against, imparted to and absorbed by the object or substance being drilled and not by the housing or drill itself. Thus the rotary impact mechanism is in essence floating on the object being drilled and the drill and housing are preserved against deleterious effects and vibration due to the impacts being transmitted thereto.

The chuck 1 embodying this invention comprises a body member 67 and means at the end of the chuck remote from screw shaft 25, for supporting and gripping a bit or the like.

Body member 67, in the example shown, is mounted on screw shaft 25 by means of threaded recess 37, as described above, and is supported for rotation within housing 13 by means of bearing 19, which is held in place and against seat 17 by a second split ring retainer 30', see FIGURE 9.

As shown, the inner end of body member 67 is of reduced diameter to facilitate the assembly of the chuck into bearing 19 and is necked, as at 68, to receive a hardened steel collar 68'. Collar 68' has a diameter and area substantially equal to nut 42 so that full even flows are delivered to the chuck. The inner end of chuck 1 may take any form required by the apparatus in which the chuck is to be used, consistent with this invention as hereinafter set forth.

A central longitudinal bore 69 is provided in the outer end of body member 67 for the reception of the shank 70 of a bit, for example. The wall of bore 69 is adapted to firmly support one side of shank 70 and chuck 1 includes means to tightly force the shank against the bore wall.

Accordingly, body member 67 is also provided adjacent its forward or outer end with a threaded hole 72, extending transversely through one side of the body member and intersecting bore 69 and a set screw 73 is threadably engaged within hole 72 and is adapted to engage shank 70 and force it tightly against the opposite bore wall to maintain both the insert 75 and bit in position in the bore.

More particularly, the diameter of the bore 69 must be such that the centerline of the shank 70 lies along the axis of rotation of the chuck and each size bore, therefore, can support properly only one size of shank. It is desirable, however, that a given chuck 1, embodying this invention, be adapted to support bits having various size shanks. Accordingly, bore 69 is preferably of relatively large diameter and an insert or modifying piece 75, FIGURE 11, is provided for insertion and use within the bore. Insert 75 is adapted to modify the diameter of a perdetermined bit shank 70 so that the center of the shank coincides with the axis of rotation, even through the diameter of the shank is less than the diameter of the bore 69. Insert 75 has an external diameter equal to the diameter of bore 69 and is preferably as long as the depth of bore 69 so as to seat firmly in bore 69 and to ensure the proper alignment of the center line of the shank with the axis of rotation. Insert 75 supports one side of the shank 70 and is cut away to form a transverse, longitudinally extending surface 74 exposing the other side of the shank 70 for engagement with the set screw 73 and, therefore, preferably has a semicircular cross-section, as shown.

Insert 75 is provided with a longitudinally extending groove 76 of desired predetermined diameter to properly support shank 70. Preferably and conveniently, as best seen in FIGURE 11, grooves 76 has two different diameters, extending from either end of insert 75 toward the center thereof, so that by simply inverting insert 75, end for end, within bore 69, it is usable with bits of two different shank diameters. Of course more than one insert, each having different diameter bores 76, may be provided for each chuck and chuck 1 is thereby adapted for use with a wide range of bits, by simply changing and/or inverting the inserts 75.

Chuck 1 also preferably includes a stop for limiting the entry of shank 70 into bore 69. To this end, as best seen in FIGURES 9 and 10, body member 67 is provided with a transversely extending insert 78 having a finger or stop 79 which extends into bore 69 and has a forward face 81 against which the inner end of shank 70 seats.

Preferably and conveniently, insert 78 is disposed opposite that part of bore wall 69 which supports insert 75 and hole 72 is formed in insert 78.

Alternatively, the bit stop for chuck 1 may be a land 82 extending across the grooves 76' of the modified form of insert 75' shown in FIGURE 12. Insert 75' is otherwise conveniently similar to insert 75 and the use of insert 75' preferably is in lieu of providing insert 78 in chuck body member 67, albeit both stops may be provided if desired, see FIGURE 12.

In those instances where the bit is to be subjected to a prying or leverage motion as well as to impact and/or rotation, or additional support is otherwise desirable for holding the bit against the bore wall or insert, two holes 72 and set screws 73 may be provided as shown in FIGURE 13.

As shown in FIGURE 13, when two set screws 73 are provided they are preferably disposed with their centerlines 90° apart and 45° to either side of the longitudinal plane through the center of the insert or line of contact between the shank 70 and the insert.

Chuck 1 also preferably comprises an improved set screw 73 for holding the shank 70 in the chuck. Set screw 73 is self-locking and is adapted to resist accidental loosening, within hole 72, even though the bit and chuck be vibrated rapidly and frequently. A set screw 73, embodying this invention, is adapted to be relatively easily tightened and loosened when desired and to function and operate without the use of special tools, shafts, threads or holes.

To this end, as best seen in FIGURES 14 through 22, set screw 73 is provided with a tip having a bearing surface, for engagement with the shaft, shank or surface to be held, which is eccentric with and engages the shaft, shank or surface to be held eccentric of the centerline of the threaded engagement between the set screw and the hole within which it is mounted.

Figure 14:
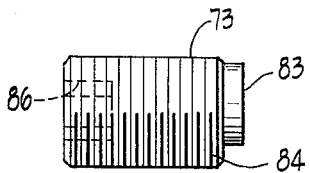
FIGURE 14 is an elevational view on an enlarged scale of the set screw shown in FIGURE 1.
Figure 15:
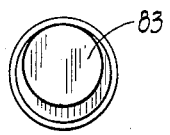
FIGURE 15 is an end view of the tip of the set screw shown in FIGURE 14.
Figure 19:
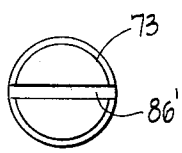
FIGURE 19 is an end view of the head of the set screw shown in FIGURE 17.
Figure 17:
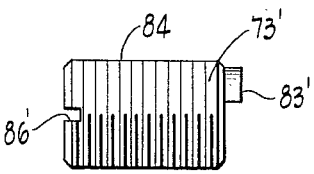
FIGURE 17 is an elevational view of a modified form of set screw embodying this invention.
Figure 18:
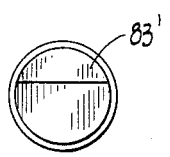
FIGURE 18 is an end view of the tip of the set screw shown in FIGURE 17.
Figure 22:
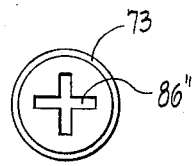
FIGURE 22 is an end view of the head of the set screw shown in FIGURE 20.
Figure 20:
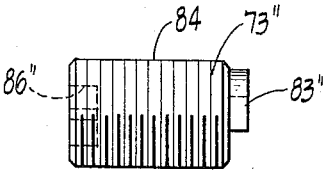
FIGURE 20 is an elevational view of another modified form of set screw embodying this invention.
Figure 21:
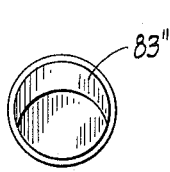
FIGURE 21 is an end view of the tip of the set screw shown in FIGURE 20.

In one form, set screw 73 is provided with a solid circular tip 83, see FIGURES 14 and 15, which is eccentric of the center line of the set screw threads 84 and a flat surface 85 adapted to engage the shaft, bit or surface to be gripped such as shank 70, for example, see FIGURES 9 and 10. Set screw 73 is also provided with a suitable and convenient head, such as hexagonal socket 86, FIGURES 14 and 16 by which it is tightened or loosened.

Tips for set screws 73 embodying this invention may take different shapes and forms as, for example, tips 83' and 83", FIGURES 17, 18, 20 and 21, provided the set screw tips have a surface eccentric to the axis of the set screw. Set screws 73, embodying this invention, also may be adapted to have any desired head such as, for example, heads 86' and 86", FIGURES 17, 19, 20 and 22. Further, any set screw and tip therefor embodying this invention may be provided with any desired form or shape of head, the examples of shapes or forms of head and use of a particular head with a particular tip, as shown, being for purposes of illustration only. Further this invention may be used with other types and kinds of fastening and holding devices, such as, for example, nuts and cap screws.

In operation a bit is mounted in a drill embodying this invention by loosening set screw 73, inserting the shank 70 of the bit in the proper grooves 76 in insert 75 and tightening the set screw against the shank. The selective action mechanism is positioned for the action desired, such as rotary-impact, and the motor turned on. The motor rotates screw shaft 25 and, thereby, chuck 1 and the bit and actuating the impact mechanism as described above. When the bit is pressed against an object to be drilled the bit, chuck and mechanism 11 float within the play provided between nut 27 and the bottom of recess 28 so as to ensure that the full impact of the nut 42 is delivered upon and against the chuck with the chuck positively holding and retaining the bit in place and thence to the bit and work face.

For test purposes, rotary-impact drills, as described above, were provided with Acme double threads having a one-half inch lead (4 to the inch) for threads 39 and 40, a fifty-pound spring 43 and a five-ampere electric motor for driving screw shaft 25. Chuck 1 was provided with an insert 75 adapted to support a ½" shank and a ¼₆" Carboloy bit having a ½" shank was secured therein, in the manner described above. The drill was then operated and drilled concrete to a depth of six inches in thirty seconds without difficulty and without the bit loosening or becoming disengaged from the chuck, even after repeated test drillings. Drill 2, as shown in FIGURE 9, is provided with a dust cover 89 which is press fitted on and rotates with chuck 34 and which has a flange 90 which extends over and is slightly spaced from housing 13.

Figure 23:
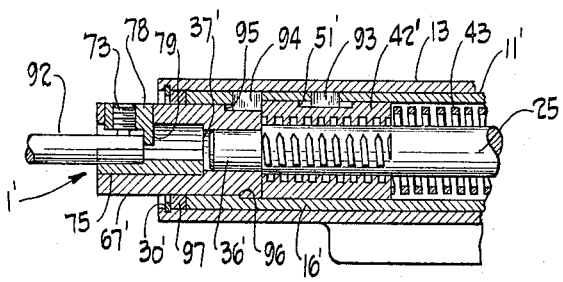
FIGURE 23 is a broken longitudinal section of another form of chuck embodying this invention.

A non-rotatable chuck 1' embodying this invention is disclosed in FIGURE 23 together, by way of example, with chipping apparatus 2' upon which it is mounted and chipper 92, which it holds.

Since, in the apparatus depicted in FIGURE 23, chuck 1' does not rotate, nut 42' is permanently secured against rotation by suitable means such as a fixed pin 93 which extends into slot 51' in nut 42'. Slot 51' extends longitudinally in the surface of nut 42' and is of sufficient length to allow for the full throw or reciprocation of nut 42' without interference from or stoppage by pin 93. The width of slot 51' is substantially equal to the width of pin 93 so that the pin effectively prevents nut 42' from rotating.

Body member 67' is provided with a rearwardly facing bore or recess 37' which functions as a bearing to rotatably support the outer end 36' of screw shaft 25 so that the screw shaft rotates independently of the chuck. Body member 67' has a sliding fit with sleeve 16' and is held against rotation by suitable means such as pin 94 which engages body member 67' in a lateral recess 95 formed therein. Chuck 1' and impact apparatus 11' are prevented from falling out of housing 13 by means of complementary interlocking lips 116 provided on body member 67' and sleeve 16'.

Recess 95 is substantially the same width as pin 94 and is of sufficient length to ensure that chuck 1' is displaceable relative to the housing in the same manner and for the same purpose as described above with respect to nut 27 and recess 28 and chipper 92, in effect, floats on the object being chipped and the full force of the impacts delivered by nut 42' are directed against the surface or object being worked.

A seal 97 is conveniently provided forwardly of sleeve 16' and about body member 67' and retaining ring 30' retains the sleeve 16' and the impact apparatus within the housing 13. Screw shaft 25 is conveniently driven in the same manner as with the preferred form of this apparatus.

In operation chipper 92 is mounted within chuck 1' and held in place by tightening set screw 73, the motor is then actuated in the manner described above with respect to the preferred form of this invention. Screw shaft 25 rotates actuating the impact mechanism and particularly nut 42' in the manner described above and since chuck 1' is secured against rotation only, impacts or vibrations are delivered to the working end of the chipper.

Changes and modifications to the forms of this invention herein particularly illustrated and described will occur to those skilled in the art who come to understand the principles and precepts thereof. According, the scope of this patent should not be limited to the specific forms of the invention herein specifically disclosed and described but by the advance by which the invention has promoted the art.

I claim:

1. A chuck for holding the shank of bits, chippers and the like, comprising a body member, a bore extending into said body member, a modifying insert disposed in said bore and having an exterior surface partly complementary to the wall of said bore and partly extending transversely and longitudinally thereof, a groove in said transverse portion of said surface of said insert, said groove extending inwardly from both ends of said insert and having a different radius at each end to support shanks of different diameters, and fastening means extending transversely of said body member and into said bore and laterally engaging the shank supported in said groove to tightly hold said shank in said groove.

2. A chuck for holding the shank of bits, chippers and the like, comprising a body member, a bore extending into said body member, a modifying insert disposed in said bore and having an external surface partly complementary to the wall of said bore and partly extending transversely and longitudinally thereof, a groove in said transverse portion of said surface of said insert, said groove extending inwardly from both ends of said insert and having a different radius at each end to support shanks of different diameters, fastening means extending transversely of said body member and into said bore and laterally engaging the shank supported in said groove to tightly hold said shank in said groove, and stop means comprising a land extending transversely of said groove intermediate its ends limiting the entry of a shank into said bore and along said insert.

3. A chuck for holding the shanks of bits, chippers and the like, comprising a body member, a bore extending into said body member, a modifying insert disposed in said bore and having an external surface partly complementary to the wall of said bore and partly extending transversely and longitudinally thereof, a groove in said transverse portion of said surface of said insert, said groove extending from an end of said insert and having a radius equal to the radius of the shank to be supported therein, a hardened insert in and extending transversely of said body member and intersecting said bore, a finger formed integrally with said hardened insert and extending transversely into said bore intermediate the length of said bore and insert limiting the entry of a shank into said bore, and fastening means comprising a threaded hole extending through said hardened insert, and a set screw coacting therewith and having an end engaging the shank disposed in said groove to hold said shank in said groove and said shank and insert in said bore.

4. A chuck for holding a shank of a bit, and the like, said chuck comprising a body member, a first bore extending into said body member, a modifying insert disposed in said first bore and having a surface partly complementary to the wall of said first bore and partly extending transversely, longitudinally thereof, a groove in said transverse portion of said surface of said insert, said groove extending from an end of said insert and having a radius equal to the radius of the shank to be supported therein, a second bore having threads therein and extending transversely of said body member and intersecting said first bore, and a set screw disposed in said second bore, said set screw having lateral threads having an axis and coacting with said threads of said second bore, said set screw also having an end having means engaging the shank to be disposed in said groove on a center eccentric of said axis of said lateral threads to hold said shank and insert in said first bore.

5. The chuck according to claim 4 with stop means limiting the entry of a shank into said first bore.

6. The chuck according to claim 4 in which said groove in said chuck insert extends from both ends of said insert and has a different radius at each end for supporting shanks of either of two different predetermined diameters.

7. A chuck for holding the shank of a bit, chipper and the like, in rotary-impact drills, and the like, having a shaft for rotating the chuck, said chuck comprising a body member on the end of said shaft for rotation therewith, a longitudinal bore in said body member, a chuck insert disposed in said longitudinal bore and having an external wall, one portion of which is complementary to the wall of said longitudinal bore and another portion of which extends transversely of said longitudinal bore, a groove in said another portion of said chuck insert, said groove extending longitudinally from an end of said chuck insert and having a radius equal to the radius of the shank to be held in said chuck and a centerline coincident with the axis of rotation of said body member, a transverse bore having threads and extending transversely of said body member and intersecting said longitudinal bore, and a set screw disposed in said transverse bore, said set screw having lateral threads engaging and coacting with said threads in said transverse bore and an end engaging said shank disposed in said chuck insert groove on a center eccentric of the axis of said set screw threads.

8. A chuck for holding the shank of a bit, chipper, and the like, in rotary-impact drills, and the like, having a shaft for rotating the chuck, said chuck comprising a body member on the end of said shaft for rotation therewith, a longitudinal bore in said body member, a chuck insert disposed in said longitudinal bore and having an external wall, one portion of which is complementary to the wall of said longitudinal bore and another portion of which extends transversely of said longitudinal bore, a groove in said another portion of said chuck insert, said groove extending longitudinally from an end of said chuck insert and having a radius equal to the radius of the shank of the bit to be held in said chuck and a centerline coincident with the axis of rotation of said body member, a transverse bore in said body member, said transverse bore being threaded and intersecting said longitudinal bore, a set screw disposed in said transverse bore, said set screw having an end engaging and holding the shank of the bit, chipper, and the like, disposed in said chuck insert groove and radially outward threads engaging and coacting with said threads in said transverse bore, and stop means intermediate the length of said longitudinal bore and insert limiting the entry of the shank into said chuck.

9. The chuck according to claim 8 in which said stop means comprises a land extending transversely of said groove in said chuck insert.

10. The chuck according to claim 9 in which said groove in said chuck insert extends from both ends of said insert and is of different radius on each side of said land whereby to selectively support shanks of different diameters.

11. The chuck according to claim 8 in which said stop means comprises an insert extending transversely of said member and having a finger extending into said bore and adapted to be engaged by the inner end of the shank.

12. The chuck according to claim 11 in which said transverse bore is disposed in said stop means insert.

References Cited by the Examiner
UNITED STATES PATENTS

| | | | |
|---|---|---|---|
| 319,202 | 6/1885 | Denton | 279—76 |
| 856,877 | 6/1907 | Hultquist | 279—85 |
| 1,391,177 | 9/1921 | Du Sell | 279—76 |
| 1,595,064 | 8/1926 | Barrett | 175—133 |
| 1,647,802 | 11/1927 | Josef | 279—83 |
| 1,744,521 | 1/1930 | Briese | 279—83 |
| 2,355,943 | 8/1944 | Beede | 85—1 |
| 2,533,179 | 12/1950 | Redinger | 279—83 |
| 2,770,276 | 11/1956 | Broder | 85—1 |
| 2,968,960 | 1/1961 | Fulop | 175—133 |

FOREIGN PATENTS 3,271   5/1911   Great Britain.

ROBERT C. RIORDON, *Primary Examiner.*

RALPH H. BRAUNER, *Examiner.*

H. V. STAHLHUTH, *Assistant Examiner.*